(No Model.) 9 Sheets—Sheet 3.

A. STARK.
GRAIN BINDER.

No. 502,540. Patented Aug. 1, 1893.

Witnesses:
J. L. Tunison
Jean Elliott

Inventor:
Andrew Stark
By Burton and Burton
his Attys.

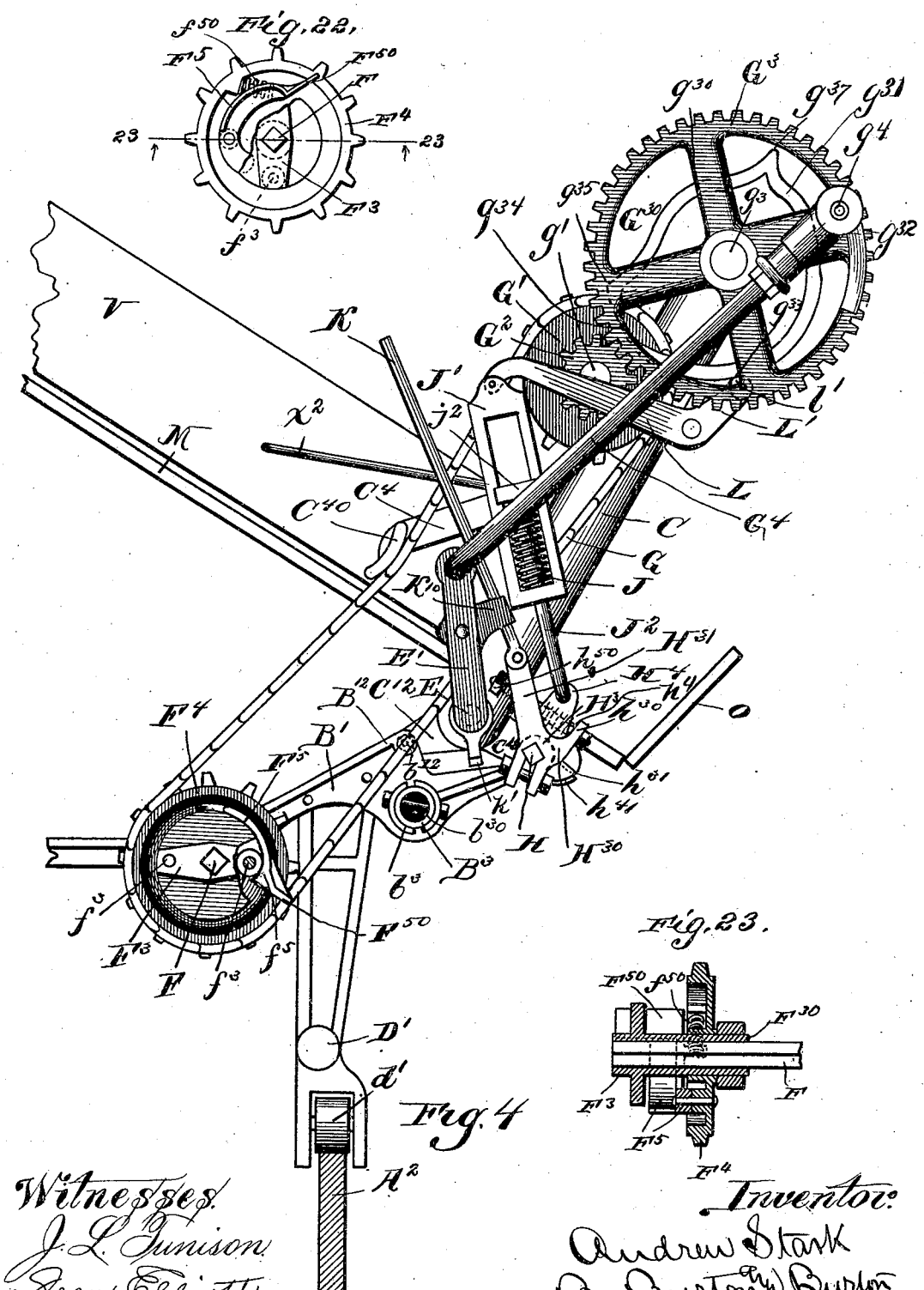

(No Model.) 9 Sheets—Sheet 5.
A. STARK.
GRAIN BINDER.
No. 502,540. Patented Aug. 1, 1893.
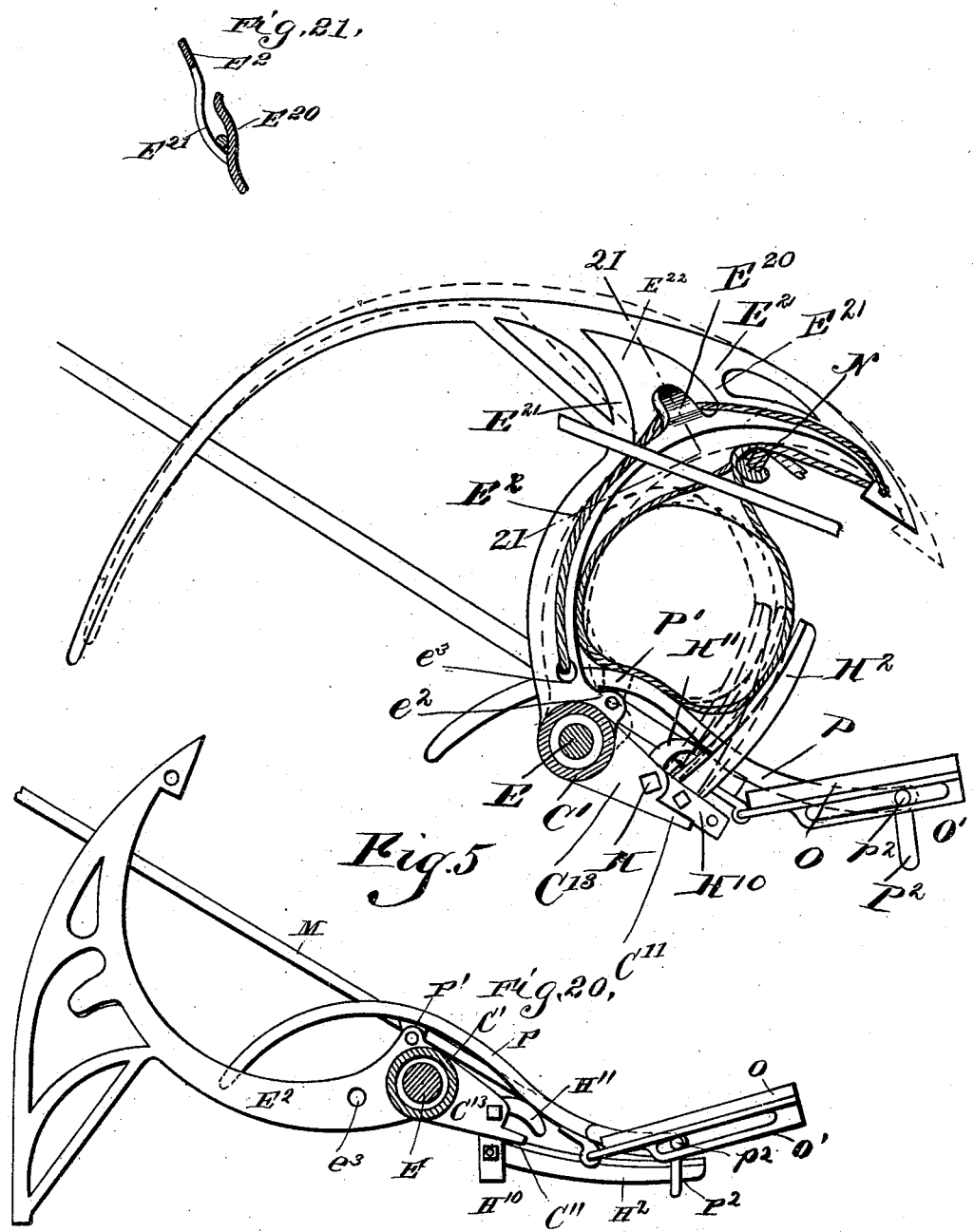

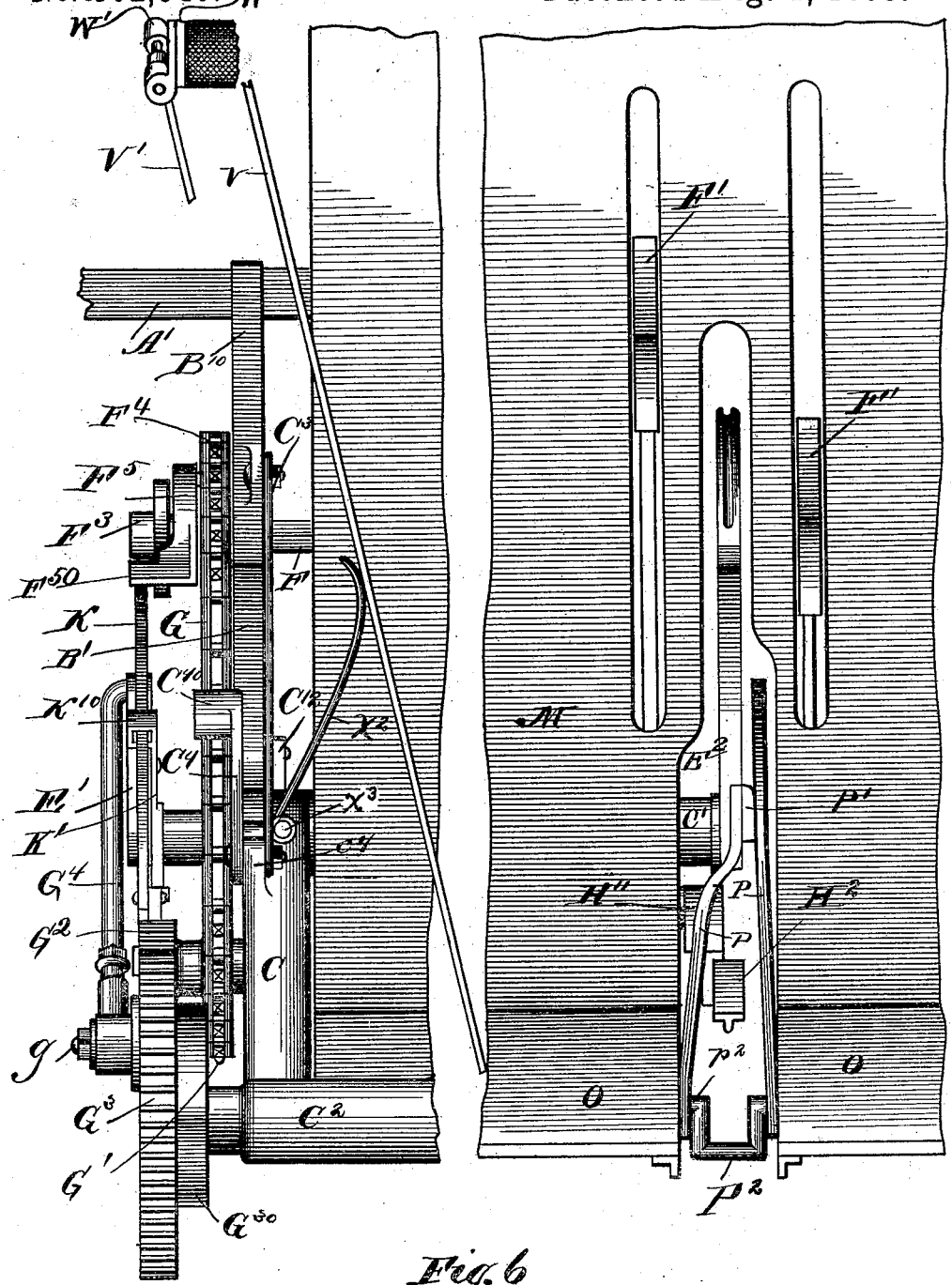

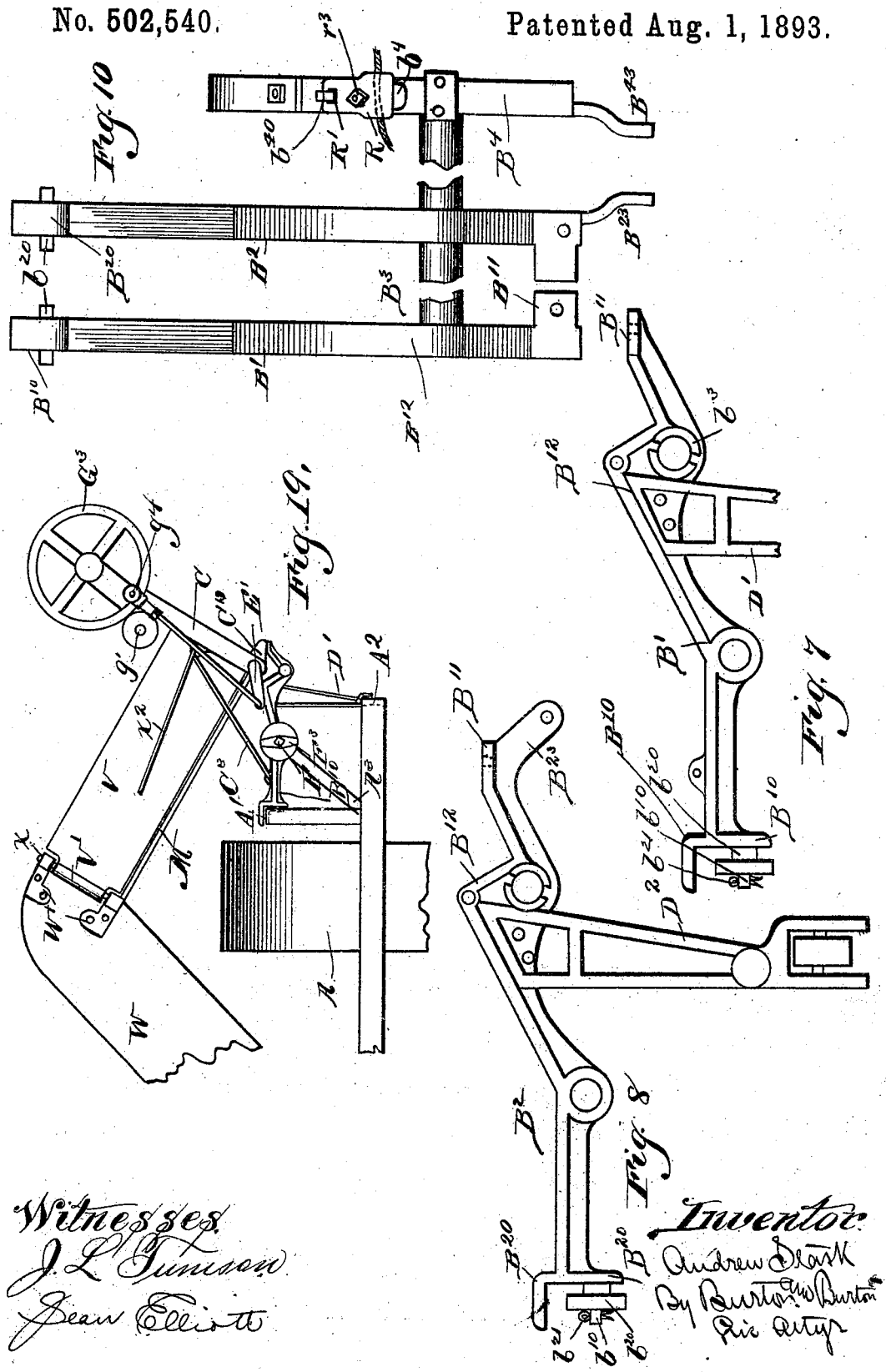

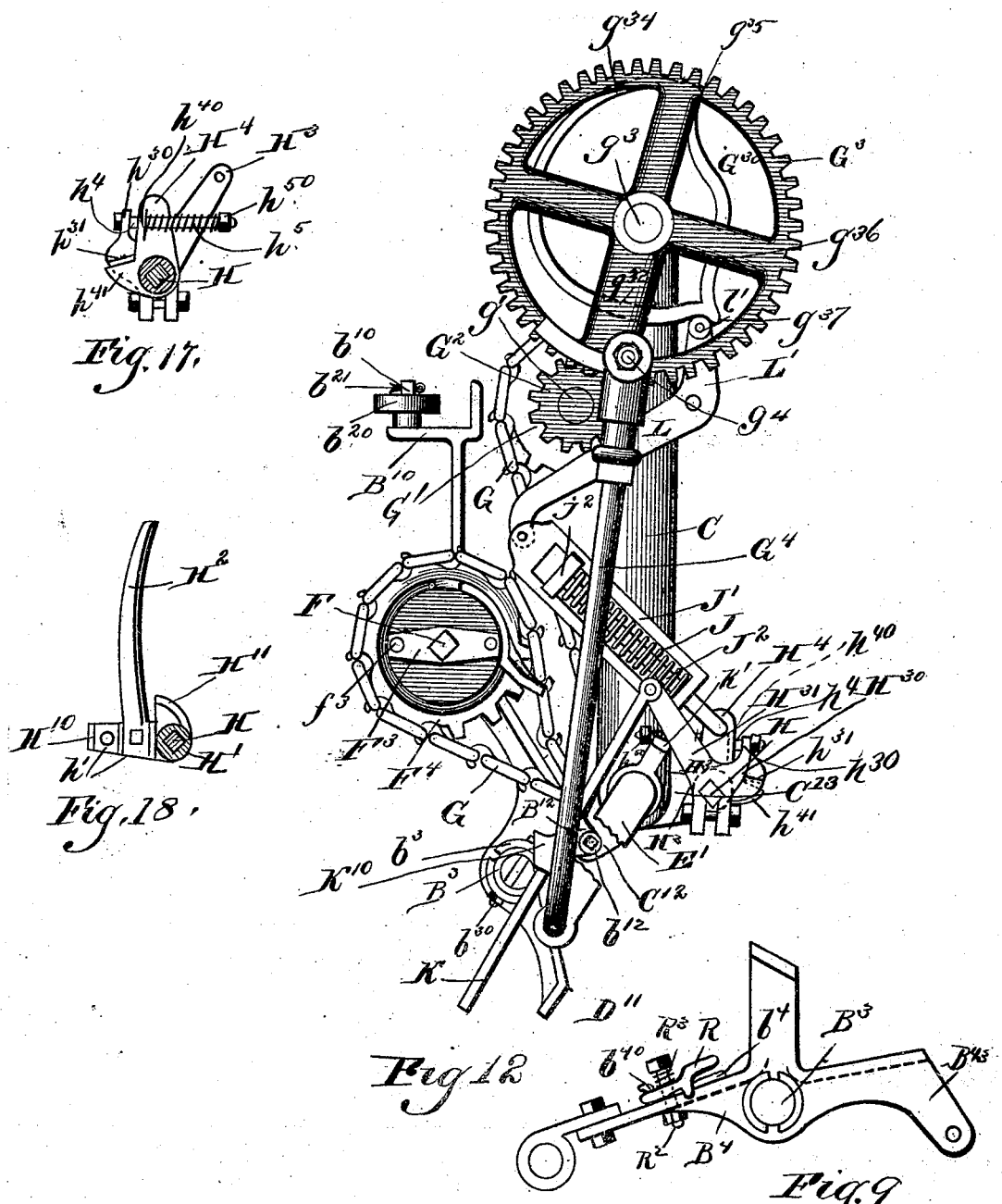

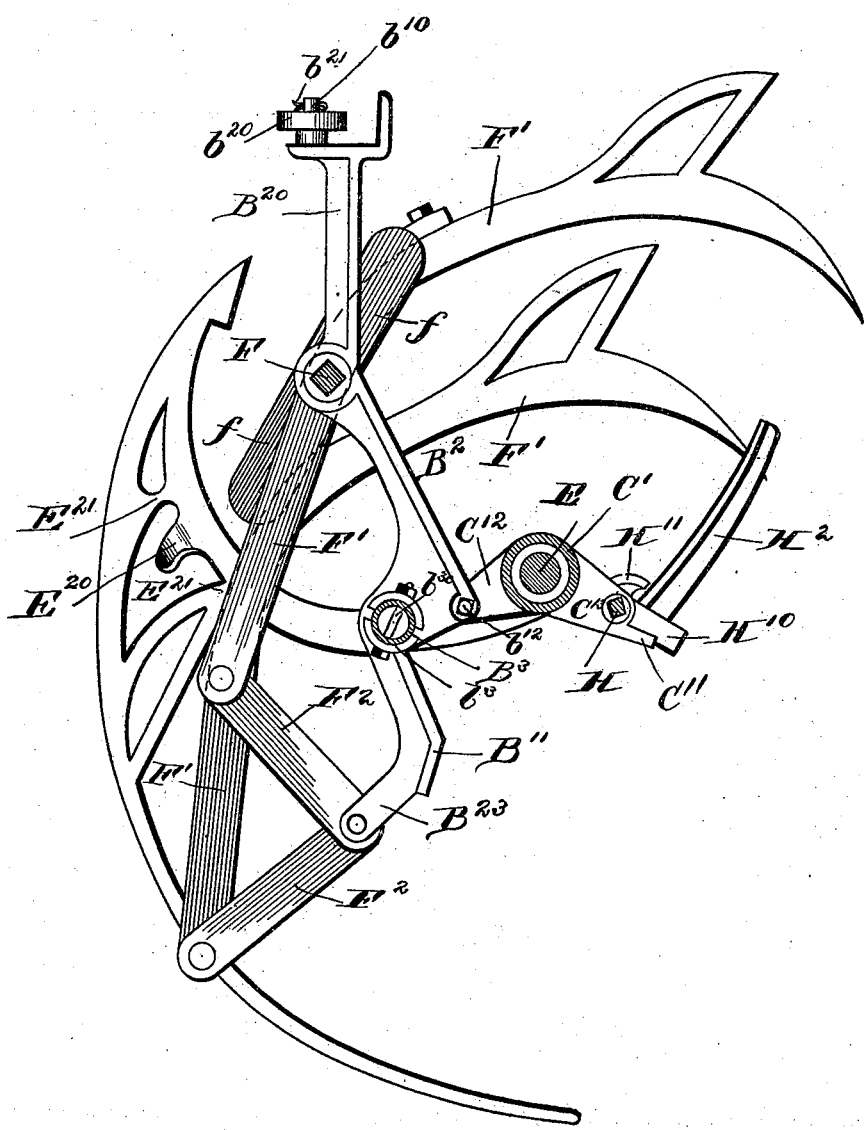

UNITED STATES PATENT OFFICE.

ANDREW STARK, OF CHICAGO, ILLINOIS, ASSIGNOR OF ONE-HALF TO THE WARDER, BUSHNELL & GLESSNER COMPANY, OF SAME PLACE, AND SPRINGFIELD, OHIO.

GRAIN-BINDER.

SPECIFICATION forming part of Letters Patent No. 502,540, dated August 1, 1893.

Application filed February 27, 1892. Serial No. 423,048. (No model.)

*To all whom it may concern:*

Be it known that I, ANDREW STARK, a citizen of the United States, residing at Chicago, county of Cook, and State of Illinois, have invented certain new and useful Improvements in Grain-Binders, which are fully set forth in the following specification, reference being had to the accompanying drawings, forming a part thereof.

Figure 1:
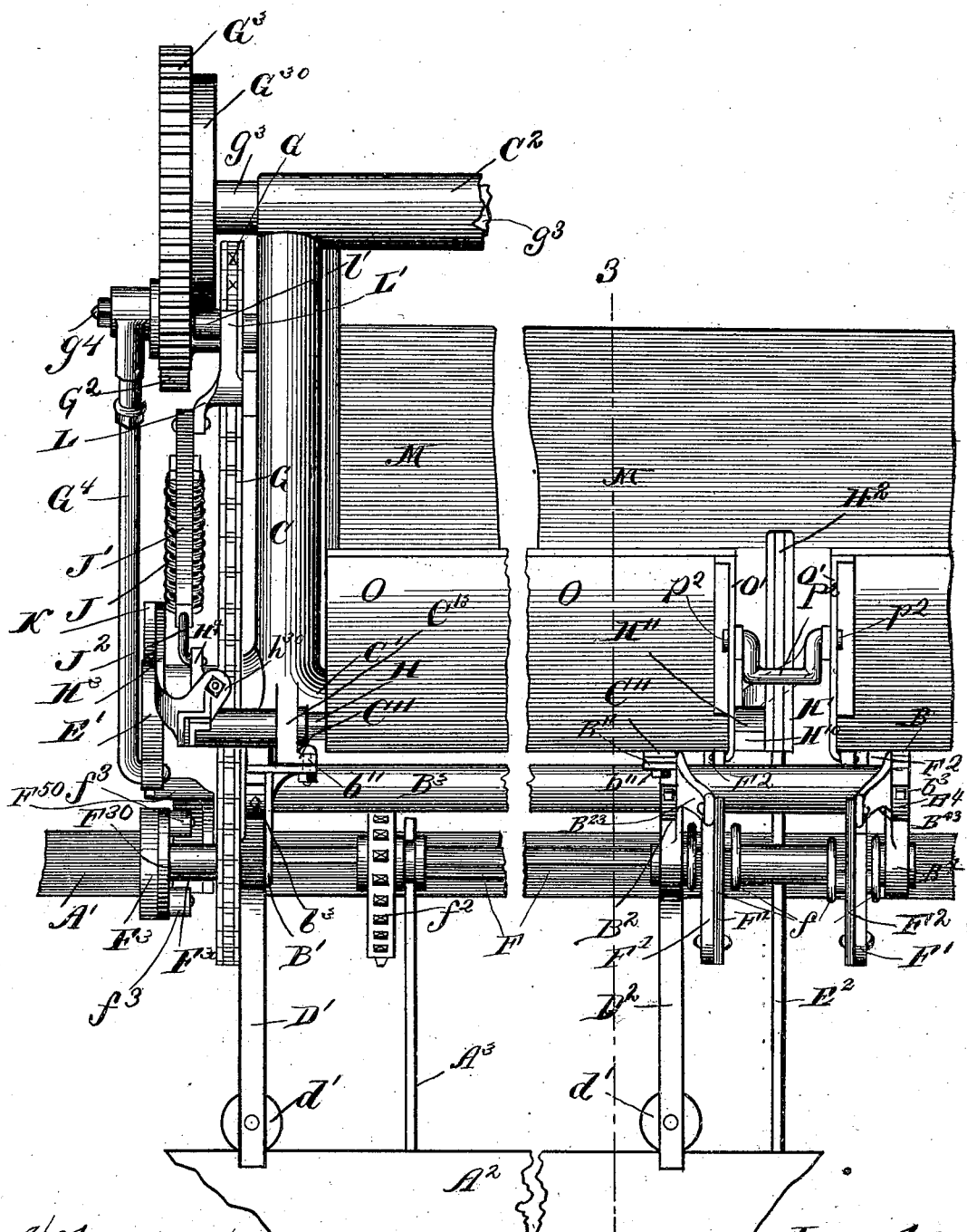
Figure 2:
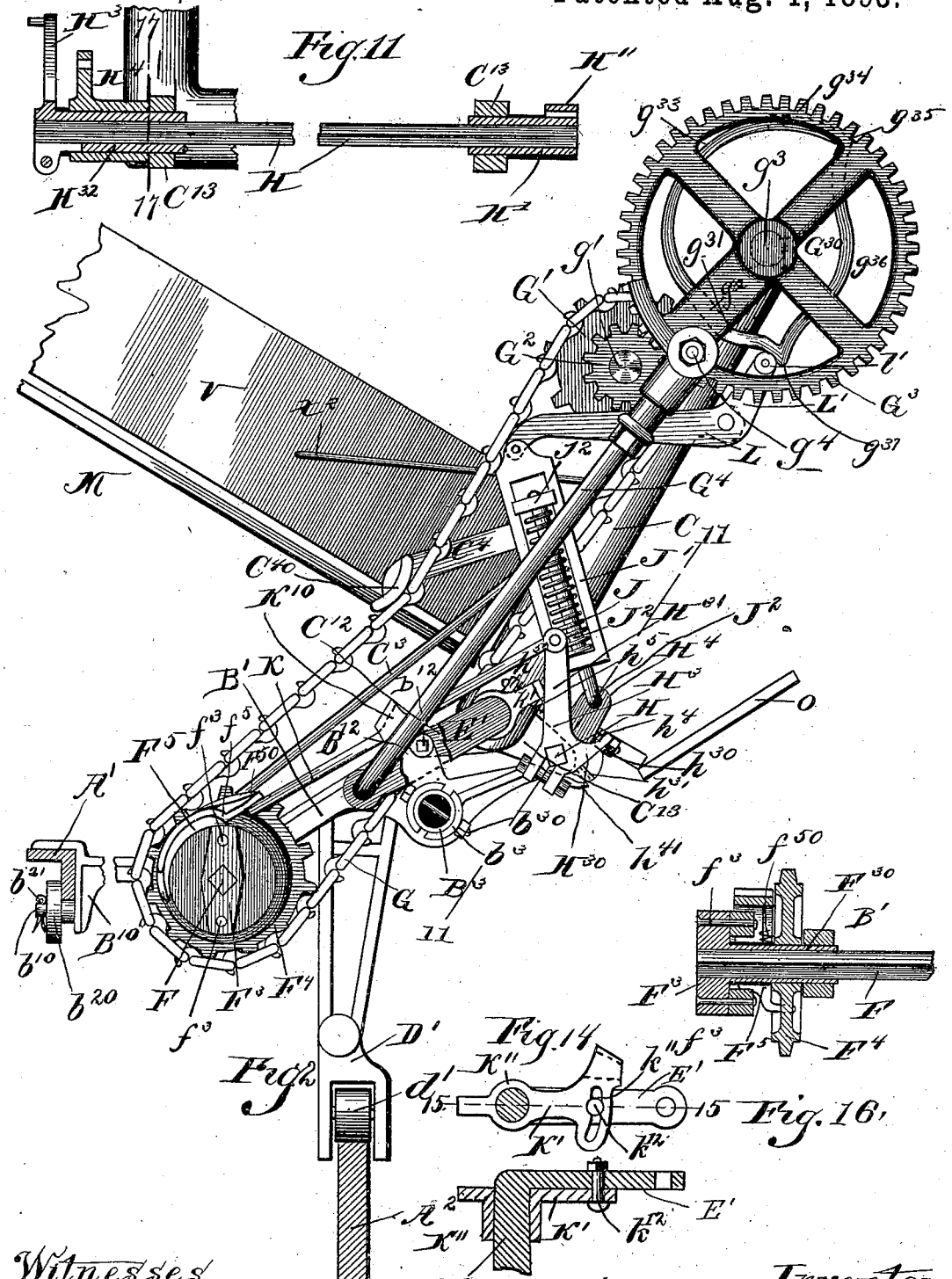
Figure 3:
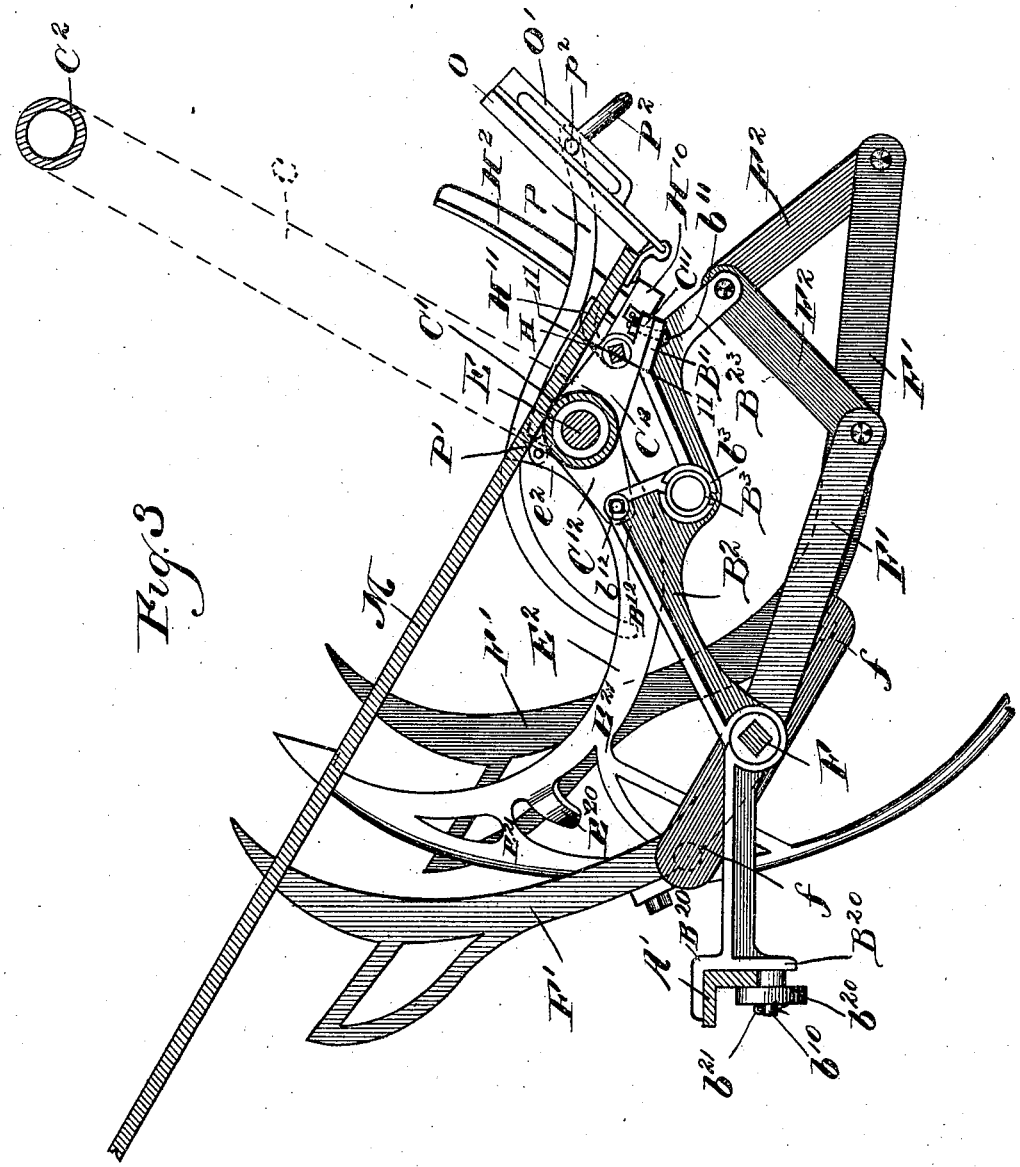

In the drawings, Figure 1 is an outer side elevation of my improved binder, showing a portion of the harvester frame to which it is attached, the middle portion of the binder being broken out and the forward portion of the deck being broken away in order to condense the figure, the parts being in the position of rest. Fig. 2 is a rear elevation of the same, in which, however, no parts forward of the break are represented. Fig. 3 is a section at the line 3—3 on Fig. 1. Fig. 4 is a view similar to Fig. 2, but showing the parts in full line in the position at which the knotter-bill starts. Fig. 5 is a view similar to Fig. 3, the position of the parts shown in full line corresponding to Fig. 4. Fig. 6 is a plan in the position of rest. Fig. 7 is a rear elevation of the rear one of the brackets which form the frame or bearing arms by which the binder is directly supported on the harvester frame. Fig. 8 is a view of the forward one of said brackets. Fig. 9 is a rear elevation of a bracket which forms part of said frame and affords bearing for the forward end of the packer-crank-shaft and its controlling lug. Fig. 10 is a plan of said entire frame, composed of said brackets and the pipe which connects them. Fig. 11 is an axial section through the trip and compressor-rock-shaft and parts secured thereto at the plane indicated by the line 11—11 on Figs. 2 and 3. Fig. 12 is a rear elevation of the portion of the binder frame which is seen in Fig. 2, showing the same folded up with the mechanism thereon for shipment. Fig. 13 is a corresponding view of the parts seen in Fig. 3. Fig. 14 is a detail sectional front elevation of a device connected to the needle rock shaft crank arm, pertaining to the mechanism by which the binder is tripped out of engagement with the driving power, the needle-rock-shaft being shown in transverse section just forward of said device. Fig. 15 is a section at the line 15—15 on Fig. 14. Fig. 16 is a detail section, axial with respect to the packer shaft of the clutching mechanism. Fig. 17 is a sectional detail front elevation of levers on the trip and compressor rock-shaft, which are connected to the trip and compressor respectively, section being made through the rock shaft and a sleeve hub of one of said levers at the plane indicated by the line 17—17 on Fig. 11. Fig. 18 is a detail elevation of the trip and compressor arm with its hub and shaft in transverse section. Fig. 19 is a detail rear elevation showing a portion of the harvester and binder frames, and, in detail, the arrangement of the head-board in relation to the frames and deck. Fig. 20 is a detail elevation of the needle and compressing devices and gate shown in the position relatively to each other and the deck which they occupy just prior to the discharge of the bundle, the frame and needle rock shaft being shown in transverse vertical section. Fig. 21 is a detail section at the line 21—21 on Fig. 5. Fig. 22 is a detail side elevation of the clutch mechanism, through which power is transmitted to the binder driving train, certain parts being broken away to disclose other details behind them. Fig. 23 is a detail section at the line 23—23 on Fig. 22.

A' and $A^2$ are fore-and-aft bars of the harvester frame, the former being located near the level of the top of the drive wheel A, the latter being below the level of the axle of said wheel. Upon these two bars, the binder frame is adapted to slide fore-and-aft in the familiar manner, and which may be effected by familiar mechanism not herein shown or described.

The binder frame comprises the customary open-front gearing frame, comprising the standard C, the lower arm C' and upper arm $C^2$, which is mounted upon a frame which comprises two brackets B' and $B^2$, which are secured to the pipe $B^3$, being provided with suitable split boxes $b^3$ at their stubbleward ends, which are adapted to be clamped together onto the pipe by means of the bolts $b^{30}$, set through the boxes and pipe, thereby making rigid connection. These brackets B' and B² are parallel, and at their grainward ends are provided with the right-angle feet B¹⁰ and B²⁰, respectively, which fit the angle-iron bar A', and are provided with the studs $b^{10}$ $b^{10}$, projecting parallel to the upper horizontal flange of the angular foot, and receive the flanged rollers $b^{20}$ $b^{20}$, which are retained thereon by linch-pins $b^{21}$ $b^{21}$, the flanges of said rollers serving to engage the vertical web of the angle-iron bar A', the rollers being put into the studs after the feet of the brackets have been suitably seated on the angle-iron, and when thus placed and secured by their linch-pins, preventing the escape of the brackets from the bar.

Rigid with the brackets B' and B², respectively, are the brackets D' and D², which extend downward from a point a little grainward of the pipe B³, and are provided at their lower extremities with anti-friction rollers $d'$ $d'$, adapted to travel on the bar A² of the harvester frame. The frame, composed of the two brackets B' and B² and the pipe B³, is thus securely supported in position on the harvester frame and adapted to be adjusted fore-and-aft on the bars which support it.

The gearing frame is secured to the brackets B' and B², and thus to the frame of which they form parts, by bolts which pass through suitable lugs on said frame and on the brackets respectively, each of the brackets B' and B² having at its stubbleward extremity a horizontal lug B¹¹, provided with a vertical bolt hole and a vertical lug B¹² provided with a fore-and-aft bolt-hole, and the gearing frame has two corresponding lugs C¹¹ and C¹². The horizontal lugs C¹¹ seat upon the horizontal lugs B¹¹, and said lugs C¹¹ and B¹¹ are bolted together by vertical bolts $b^{11}$ passing through them, and the vertical lugs C¹² stand facing and adjacent to the vertical lugs B¹² respectively, and are secured thereto by horizontal fore-and-aft bolts $b^{12}$. In order to further steady the gearing frame in position, an oblique brace bar C³ is secured to a suitable lug $c^4$ on the standard C, and extends grainwardly to the bracket B', to which it is made fast. The pipe B³, when the two frames are thus secured together, is located parallel with and below the lower arm C' of the gearing frame, through which the needle-rock-shaft extends, and both the brackets B' and B² are located rearward of the vertical plane of the end of the arm C'—that is to say, rearward of the vertical plane of the path of the needle. The pipe B³, however, extends forward past that plane, and at its forward end serves to support the bracket B⁴ located wholly in front of the plane of the path of the needle, serving to support the front section of the deck and afford a bearing for the front end of the packer shaft, and the controlling link for the forward packer and also certain other devices, as hereinafter explained.

E is the needle-rock-shaft, journaled, as stated, in the lower arm C' of the gearing frame, having at its rear end the crank E', and at its forward end the needle E².

F is the packer crank shaft. It is journaled in the brackets B', B² and B⁴, and has the customary cranks $f$ $f$ for operating the packers F' F', which are controlled by the links F² F², which are pivotally connected respectively to the brackets B² and B⁴, which have the lugs B²³ and B⁴³ for that purpose. The shaft F is square from the rear crank to the rear end, but is provided with a round collar with a square aperture by which it is secured to said square shaft and constitutes its bearing in the rear bracket B', said collar being conveniently formed as a part of the hub of a clutch wheel hereinafter described.

$f^2$ is the binder-driving sprocket wheel, which is adapted to slide on the shaft F, or, more correctly speaking, is adapted to permit the shaft to slide through it as the binder is adjusted fore-and-aft, said sprocket wheel being held in its proper position in line with its driving wheel on the harvester frame by a suitable bracket arm A³ extending out from that frame. The clutch at the rear end of the packer-crank-shaft comprises the clutch dog F³, which has the long hub F³⁰, through which there is a square opening to receive the packer shaft, which may be pinned fast therein, the dog being applied to the shaft after the shaft is properly placed in its bearings in the brackets B' and B². Said hub extends into and constitutes the bearing of the packer shaft in the rear bracket B', and it also constitutes the bearing of the sprocket wheel F⁴, which is located rearward of the bracket B', the said clutch dog, being therefore inserted through said sprocket wheel when it is passed onto the square packer shaft and into its bearing in the bracket B'.

To the rear face of the sprocket wheel F⁴ is pivoted the latch F⁵, and from the forward face of the clutch dog project the studs $f^3$ $f^3$, suitably supplied with anti-friction rollers adapted to engage the short curve $f^5$ of the latch F⁵, when it is permitted to drop down into the track of said rollers, as hereinafter explained. The latch F⁵ has the nose F⁵⁰ extending from its free end, by which it is engaged to trip it free from the dog, as will be hereinafter explained. The spring $f^{50}$, suitably stopped between the latch F⁵ and the sprocket wheel F⁴ tends to throw the latch toward the center. The chain G, driven by the sprocket wheel F⁴, passes around and drives the sprocket wheel G', journaled on a stud axle $g'$ on the gear frame standard C, said sprocket wheel having rigid with it the gear pinion G², which meshes with and drives the main binder wheel G³, whose shaft $g^3$ extends to the upper arm C² of the binder gear frame, and which, by means of the pitman G⁴, pivoted on the crank wrist $g^4$, and connected at the opposite end to the crank E', actuates the needle rock shaft.

C⁴ is an arm secured to a lug $c^4$ on the gear frame standard C, and adapted to be adjusted about its securing bolt in a vertical plane, said arm extending alongside the plane of the chain G, and having, at its free end the curved flange $C^{40}$ which rides upon the chain and takes up the slack, said arm being adjustable on its securing bolt for that purpose.

The trip and compressor are one, one arm being adapted, by the mechanism which will now be described, to perform both functions. H is its shaft, said shaft being square, but having round bearing surfaces provided on it by the parts secured to and rocking with it, as hereinafter explained. This shaft is supported and rocks in bearings formed in lugs $C^{13}$ $C^{13}$, provided on the arm $C'$ of the binder gearing standard frame. These lugs $C^{13}$ carry the lugs $C^{11}$ above mentioned. The trip is made in two pieces in order that the arm or finger $H^2$ may be adjusted on the hub $H'$ according to the size of the bundle which it is desired to form, two seats $h'$ $h'$ being provided on the lug $H^{10}$, which projects from the hub to afford fastening for the arm or finger $H^2$. The hub $H'$ is extended into the forward lug $C^{13}$, and forms the bearing surface of the shaft H therein. It has another feature, the purpose of which will be hereinafter explained,—to-wit, the web $H^{11}$, eccentric with respect to the shaft H, and located grainward from the trip finger $H^2$. At the rear end of the shaft H is the bell-crank-lever $H^3$, provided with a hub $H^{32}$ with a square opening by which it is fitted to and prevented from turning on the shaft, said hub being extended also to form the bearing surface of the shaft H in the rear lug $C^{13}$, but between the bell-crank and said bearing, there is journaled on the same hub the short lever $H^4$. The arm $H^{30}$ of the bell-crank lever $H^3$ has a lug $h^{30}$, and the lever $H^4$ has a lug $h^{40}$; and when the two are assembled on the shaft H, as they are designed to operate, the lugs $h^{40}$ and $h^{30}$ stop against each other face to face. A rod $h^4$ extends through both said lugs, being stopped outside the lug $h^{30}$ by a nut, and having coiled upon it outside the lug $h^{40}$ the spring $h^5$, stopped at the other end of the rod by the nut $h^{50}$. The tension of this spring may be adjusted by screwing up the nut $h^{50}$, and, as will hereinafter appear, it controls the tension of the trip arm, and it is therefore termed the trip spring. The levers $H^3$ and $H^4$ are provided with stop shoulders $h^{31}$ and $h^{41}$, which come together when the lugs $h^{30}$ and $h^{40}$ are separated a certain distance, being the distance necessary to withdraw the trip rod K from under the nose of the latch $F^5$, said trip rod being pivotally connected to the end of the arm $H^{31}$ of the bell-crank-lever $H^3$, and extending thence through a slide-bearing $K^{10}$ in the arm $K'$, which is adjustably secured to the needle rock shaft crank $E'$, and which, when the needle is at rest, occupies such position that the trip rod K, extending through the slide $K^{10}$, and being engaged under the nose $F^{50}$ of the latch $F^5$, holds the latter out of engagement with the clutch dog $F^3$. The arm $K'$ is connected to the crank $E'$ by having a hub $K^{11}$, seen in Figs. 14 and 15 which is passed over the rock-shaft E, before the latter is put in place, and brought up against the crank on the forward side, and is provided with a slot $k^{11}$, through which is inserted the bolt $k^{12}$, which secures it to the crank arm $E'$, so that it may be adjusted about the shaft E to the limit of the slot. Such adjustment is necessary to correspond to any adjustment which may be made of the length of the pitman $G^4$, the latter adjustment being necessary to compensate for wear of the pivots in order to bring the needle to the right position.

J is the compressor spring, which is inclosed in the exterior portion $J'$ of the telescoping compressor link, which comprises also the rod $J^2$, about which the spring J is coiled, being stopped against the lower end of the portion $J'$ of the link and against the nut $j^2$ on the rod, whereby the spring resists the extension of the link. The rod $J^2$ is pivotally connected to one arm of the lever L $L'$, whose arm $L'$ is provided with an anti-friction roller $l'$, which bears upon the cam $G^{30}$ on the wheel $G^3$, whereby said cam, as the wheel revolves, actuates the lever L $L'$. Certain functions of this mechanism depend upon the form of this cam, which will be hereinafter more specifically pointed out.

The mode of operation of the structure thus far described is, that when the grain is accumulated on the deck M by the packers in sufficient quantity to rock the trip and thereby the bell-crank lever $H^3$ compressing the spring $h^5$, until the shoulders $h^{31}$ and $h^{41}$ of the levers $H^3$ and $H^4$ come in contact, said motion of the lever $H^3$ withdraws the trip rod K from under the nose of the latch $F^5$, permitting said latch to be thrown by the spring $f^{50}$ toward the packer crank shaft, bringing the short curve $f^5$ of said latch in the path of rotation of the abutments $f^3$ of the dog, whereupon one of said abutments engaging the latch at this point, by means thereof rotates the sprocket wheel $F^4$, and drives the binder train, causing the needle-rock-shaft to be actuated to advance the needle through the deck and flowing grain to encompass the bundle. When the binder stands at rest, the roller $l'$ on the lever L $L'$ rests against the cam $G^{50}$ at the position shown in Fig. 2. For a short distance from that point to the point $g^{31}$, the cam is concentric with the wheel. From the point $g^{31}$ to the point $g^{32}$, the course of the cam approaches the center. While this portion of the cam is revolving past the roller $l'$, the needle is rising through the grain, and the form of the cam at this portion is such as to permit the trip and compressor $H'$ to recede from the needle, thereby permitting the grain which has been accumulated by the packers, and which has been cut off from the flowing grain by the first entrance of the needle through the deck to spread out stubbleward, and lie somewhat loosely on the deck, so that the needle may more easily penetrate it. This movement also causes the grain to draw an excess of cord to the stubbleward side of the bundle at this stage, so that when afterward the bundle is compressed by the simultaneous advance of the needle and compressor toward each other from opposite directions, this excess affords, at the stubbleward side of the bundle, the slack cord which the knotter especially requires at that side. After the needle has substantially penetrated the grain and completed the division of the bundle or gavel from the flowing grain behind or grainward from the needle, the portion of the cam which is passing over the roller $l'$ is eccentric to the wheel $G^3$, and diverging from the center in the direction from which the wheel approaches the roller, so that while this portion from the point $g^{32}$ is passing the roller, it is forcing the roller outward from the center of the wheel, and rocking the lever L L' in a direction to rock the trip and compressor back again toward the needle, causing thereby the bundle to be compressed between the needle and said trip and compressor. Such compression is continued through the remainder of the rotation of the wheel $G^3$, until the needle has carried the cord around the bundle, and laid the needle cord in position to be taken by the knotter-bill, conventionally represented in Fig. 5, and indicated by the reference letter N. At this point, the advance of the needle is practically completed, although it will advance very slightly more and then recede a slight distance while the crank wrist $g^4$ is passing the line from the center of the shaft $g^3$ to the wrist of the crank E', the cords being, at this time, engaged by the knotter-bill for the purpose of forming the knot, the position being shown by the full lines in Fig. 5. While the needle is going through this stage of its own movement, the portion of the cam $G^{30}$ beyond the point $g^{33}$, is passing the roller $l'$, and from the point $g^{33}$ to the point $g^{34}$, which reaches the roller when the needle is at the limit of its movement, the form of the cam is eccentric and diverging from the center, and it is, therefore, actuating the lever L L' so as to cause the trip and compressor H' to advance toward the needle and compress the bundle severely, the tension of the compressor spring J controlling the degree of compression effected at this stage, which is the stage of greater pressure at any time exerted upon the bundle. The purpose of giving to the compressor and needle such relative movement after the cords have been laid within the grasp of the bill, is that by thus compressing the bundle after the band has encircled it, and the point on the cords at which the bill engages them determined by such actual engagement, slack cord is furnished from the band for the purpose of the loops which are being formed on the bill by its rotation. It is chiefly important to afford such slack in what is technically known as the "holder cord,"—that is, the portion of the band which runs from the holder half way round, as distinguished from the cord which runs from that portion on around to the needle,—because, as to the latter, called the "needle cord," the needed slack is drawn with comparative ease past the holder and through the eye of the needle. After the needle commences to recede, and while it is passing from the most advanced position, shown in dotted line in Fig. 5, back to the position shown in full line, the compressor is still, by the form of the cam $G^{30}$, being forced grainward, but now the needle is also moving grainward, and the bundle is therefore carried bodily a little grainward. It should be noticed that at the extreme stubbleward position of the needle, the cords are drawn from the bill somewhat stubbleward,—that is, the bundle is a little farther stubbleward than it would naturally hang if supported by the cords on the bill. The retreat of the needle, accompanied by the grainward advance of the compressor carrying the bundle grainward as just described therefore gives the cords some slack, which is chiefly furnished to the holder-cord, and such slack is taken up immediately by the rotation of the bill. By the time the bill has revolved half way it has usually taken all the cord necessary, and at this stage, the point $g^{35}$ of the cam $G^{30}$ passes the roller $l'$, and during the immediately succeeding portion of the rotation of the wheel $G^3$, the course of the cam $G^{30}$ is such as to cause the pressure of the trip arm to be relaxed, to permit it to yield grainward. During this portion of the revolution, the knot is being completed and severed and the bundle ejected, and these results are accomplished by the time the point $g^{36}$ has reached the roller $l'$, and from that point on the course of the cam is divergent from the center and tends to restore the trip and compressor H' to its original position, the last stage of that motion being that in which the roller passes over the point $g^{37}$, which passage causes the compressor spring to be compressed, and when it is passed, the spring throws the roller $l'$ into its seat on the farther side of said projection $g^{37}$ and the binder comes to rest, and is, by the engagement of the roller at that point of the cam prevented from reverse motion, the binder being brought to rest as stated by the operation of the trip rod K, which, during the rocking of the needle-rock-shaft, has been lifted by its sliding bearing plate $K^{10}$, while the crank-arm was rising and has been descending while the crank-arm was making the latter half of its revolution, and has so far descended that its end is in the path of the nose $F^{50}$ of the latch $F^5$, and said latch, colliding with it, is lifted out of engagement with the clutch dog, whereby the wheel $F^4$ is disconnected from the driving power and positively stopped an instant later by the resistance of the rod K to the latch $F^5$, so that the mechanism comes to rest in the position shown in Fig. 2. The adjustment of the arm K', relatively to the crank E', must be such as to cause the rod K to reach the position where it can arrest the latch F⁵ in apt time,—that is, in time so that the mechanism will come to rest by reason of such engagement,—not before, but immediately after, the roller $l'$ has passed the crest $g^{37}$ of the cam $G^{30}$. Since the same part $H^2$ performs the double duty of trip finger and compressor arm, and since, in the performance of the latter function, it is made to move grainward to compress the bundle, it must stand during the accumulation of the bundle, and up to the time at which it acts as a trip, at a position farther stubbleward than that to which it moves while acting as a compressor. Whatever serves to arrest and detain it at the position wherein it operates as a trip, must be out of the way and cease to detain it when, acting as a compressor, it moves grainward from the trip position. A projection $k'$ on the part $K'$, extending in the opposite direction from the main arm of said part $K'$ and the crank arm $E'$, meets this condition and is provided for that purpose, such projection being in position to stop the lever arm $H^{31}$, as seen in Fig. 2, when the binder is at rest, and being carried out of the way, as seen in Fig. 4, while the bundle is being compressed.

In the foregoing description, no reference has been made to certain other parts which are important, though not indispensable. These will now be described. O is a gate hinged to the stubbleward edge of the binder-deck divided in the plane of movement of the trip and compressor $H'$, adapted in ordinary position to stand outside of,—that is, stubbleward from,—the latter, and designed to support the heads and butts of the bundle, both for the purpose of preventing its premature discharge, and especially for the purpose of keeping it straight,—that is, for the purpose of preventing it from tilting over the trip and compressor as a fulcrum, and being delivered endwise or obliquely, instead of sidewise, as is most desirable. This gate is operated by a link connection with the needle arm. The part P, which makes this link connection, has certain other functions as well. It is an arm having a downwardly projecting lug $P'$, by which it is pivoted to the lug $e^2$ on the needle $E^2$ near to its hub. The arm P is located in a slot in the deck and above that slot in the same vertical plane, and extends out stubbleward, being forked to pass the trip and compressor $H'$, one fork arm being given a sliding pivotal connection to the slotted guide $O'$, which is secured to the edge of one section of the gate O, adjacent to the rift between the two sections thereof, and the other fork arm having similar connection to a corresponding guide $O'$ secured to the other section of the gate. The yoke $P^2$, by its wrists $p^2$, constitutes the pivotal connection of the fork arm to the slotted guides, and serves a further purpose hereinafter explained. The arm P rests upon the hub of the trip arm, and, specifically, upon the eccentric web $H^{11}$, formed on said hub as hereinabove explained; and from this construction, it results that as the needle arm rises, the arm P, sliding on its support $H^{11}$ on the hub of the trip, causes the gate O to tip stubbleward, and, as the needle arm returns to its position of rest, causes it to be pulled up again to its normal position, in which it performs its principal function of supporting the grain during the formation of the bundle. But the precise action of this gate with respect to the trip arm requires further explanation. When the bundle is being accumulated by the packers, the gate stands in such position stubbleward from the trip that the trip will receive the pressure of the grain, and said trip, being located between the planes of the packers, the work done by the latter will not be so great as if the grain were supported under its whole length as it would be by the gate, and, at the same time, the gate is near enough to the trip, so that, as the grain is somewhat folded about the trip as it is accumulated against the latter, the gate supports both heads and the butts of the straws. For the same reason that the gate O is made to stand stubbleward from the compressor during the packing of the bundle, it is desirable that it should be made to stand still farther stubbleward during the compression of the bundle, as the straw is more bent by the compression than by the packing. Therefore, when the needle rises to encompass the bundle, and the compressor, (after first receding slightly, as above explained) advances toward the needle to assist in the compression, the gate O is tilted stubbleward by the stubbleward thrust of the arm P, due to the advance of the needle which actuates that arm. But it is still desirable that the gate should assist in holding the bundle to keep it straight upon the deck, and the shape of the rod P is therefore such, when it slides on the hub of the trip, as to partly counteract the effect of the stubbleward thrust of said rod in tilting the gate, and such outward tilting of the gate is further counteracted by the eccentric web $H^{11}$ on the hub of the trip which operates as a fulcrum of the arm P, and which, being rocked grainward in the compressing action of the trip and compressor arm, lifts the arm P, which rests upon it, and causes it at its outer end to stand higher and hold the gate more nearly erect than it otherwise would. A further function pertains to the arm P,—to-wit, that when the needle advances, it lifts said arm against the bundle, and it becomes thereby the support of the bundle in the plane of the band,—that is to say, substantially in the plane of compression to which the bundle is subjected by the needle and compressor, and it becomes, therefore, a third means of compressing the bundle, which is more easily compressed to a given degree by the pressure exerted thus on all sides of it, than it could be by pressure on two sides while it lies on the deck, because, in the latter case, which is the usual condition, the straw farthest from the deck in the bundle is bent most while that on the deck is bent scarcely any at the plane of compression, except as the strain of the cord itself may lift the straw at the plane of the band and thereby bend it at that plane when it is tightened about it. By substituting this positive means for compressing the bundle from beneath at the plane of the band, the needle and cord are relieved of so much of the strain, and the cord may therefore be placed around the bundle more tightly with a given tension on the cord and consequent strain on the knotting mechanism. When the bundle is bound and the compressor lever can roll off the point $g^{35}$ on the cam $G^{30}$, and the compressor is thereby permitted to fall stubbleward, it is arrested by the yoke $P^2$, and lies on that yoke and is lifted by it to the position shown in Fig. 20 by the further retreat of the needle, and while the portion of the cam from $g^{35}$ to $g^{36}$ is passing the cam roll, the position of the compressor is wholly dependent upon the retreat of the needle, and both the compressor and the gate are lifted to an angle with the deck, the compressor being however completely shielded by the gate, so that the gate affords a sufficient obstruction to the ejection of the bundle to cause the latter to be straightened against the gate and ejected past it directly sidewise. After the bundle is ejected, the cam $G^{30}$ actuates the compressor lever to restore the trip and compressor to initial position, seen in Fig. 3, and the complete retreat of the needle effects the same result for the gate.

For the purpose of providing reliable and uniform tension for the cord, I provide the tension latch R on the bracket $B^4$, the bracket being provided with the hooked lug $b^{40}$, and the latch having an aperture R', through which the lug passes, so that the lug constitutes an open bearing at which the latch is pivoted to the bracket, and in order to retain it in the open bearing, and at the same time provide the tension, the bolt $R^2$ is inserted through the web of the bracket and through a suitable hole in the latch, and the spring $R^3$ is coiled about the bolt above the latch and stopped and regulated as to its tension by the nut $r^3$ on the bolt above the spring. The cord is suitably guided to the vicinity of and inserted under the latch so as to be pressed between the proximate surfaces of the latch and bracket and runs thence to the eye $e^3$ at the heel of the needle. From the cord-guide-eye $e^3$, the cord runs to the self-threading cord guide formed by the finger $E^{20}$, located opposite the aperture $E^{22}$ between the portions $E^{21}$ $E^{21}$ of the open web of the needle, said web being slightly deflected forward where the finger is curved rearward or hooked, so that its point extends to or past the vertical plane of the web $E^{21}$ $E^{21}$ sufficiently to prevent the cord from escaping after it has been hooked over said finger from the forward side. The cord thence runs to the eye of the needle.

One peculiarity of the binder is a device which I will now explain, whereby it is adapted to be folded together for shipment in a manner to greatly reduce the bulk of the box or crate which will contain it, thereby reducing the cost of shipment and increasing the convenience of handling. It will be observed that the frame composed of the brackets B' and $B^2$ and the pipe $B^3$, supports the gearing frame, which is secured to the brackets by fore-and-aft horizontal bolts $b^{12}$ through the vertical lugs $B^{12}$ and $C^{12}$, and also by vertical bolts $b^{11}$ passing through certain horizontal lugs described on the two frames. When preparing this binder for shipment, the brace-bar $C^3$, being detached by unbolting it at either end, the bolts $b^{11}$ are removed and the two frames are then found to be hinged together, the bolts $b^{12}$ constituting the pintles of the two hinges, and being in line fore-and-aft, and said frames, with all their mechanism, may be folded together about the axis of said hinges, the chain G being doubled at about the middle without removing it from its sprocket wheels, the tightener $C^4$ having its flange $C^{40}$, in the position on the chain at which the latter is properly folded as the two frames are thus folded together, so that said tightener serves to keep the chains on said sprocket wheels, notwithstanding they are brought so close together that it would otherwise be so slacked as to escape. It will be understood that the binder-deck is removed from the frame-work when it is thus prepared for shipment.

I have illustrated in the drawings an improvement in the head-board. The device commonly known by this term has the function of checking the grain at the rear end of the binder-deck, both for the purpose of preventing it from sliding off at that end, and also for the purpose of adjusting short and scattering straw toward the needle, where it may be included in the bundle as it is formed by the packers. This swinging or free end is often secured by fixing a projecting stop on the deck just outside of the head-board, in such position that the adjustment of the binder fore-and-aft carries the head-board with it positively. But this is objectionable because it does not permit the head-board to yield for the passage of the longer grain, as is often desirable when the binder is adjusted forward for short grain, and thus it becomes a serious obstruction rather than an aid. To avoid this difficulty, others have attached a spring to the elevator frame near the swinging connection of the head-board, thus normally throwing the board forward against the heads of the grain, irrespective of its length or the position of the binder. This construction is also objectionable, for it seriously interferes with the free movement of long grain or does not stand far enough over the deck for very short grain. To avoid these difficulties, and to secure the utmost advantage to be derived from the use of such device, I have attached a spring arm $x^2$ to the binder, and preferably, to the upright member of the binder frame, at $x^3$, with the free end extending toward the elevator and pressing against the outside of the head-board V about midway of its length. It will be readily seen that as this spring arm moves with the binder when it is adjusted for long or short grain, the head-board is held with a constant yielding pressure against it sufficient to direct the short and scattering grain to its upper position, and yet allowing longer grain to pass down without undue obstruction.

W represents the rear side-board of the elevator frame, to the upper end of which the head-board V is pivoted, W' V' constituting the hinge, whose pintle $x$ is at right angles to the plane of the deck M.

I claim—

1. In a grain binder, a frame supported directly on the harvester frame and having bearings for the packer-crank-shaft, and a binder-gearing-standard frame having a bearing for the needle-rock-shaft, said frames being hinged together at a horizontal fore-and-aft line and thereby adapted to fold together: substantially as set forth.

2. In a grain binder, the frames on which are journaled respectively the needle-rock-shaft and the packer-crank-shaft, said frames having each two pairs of lugs in corresponding situations on the two frames, bolts which secure the corresponding lugs together; the bolts which pertain to one pair of lugs being out of line fore-and-aft with those of the other pair; whereby the frames are rendered rigid with each other by all said bolts, one pair of bolts being axially in horizontal fore-and-aft line, whereby they constitute hinge connections between the frames when the other lugs are disconnected: substantially as set forth.

3. In a grain binder, the frames on which are journaled respectively the needle-rock-shaft and the packer-crank-shaft, said frames having hinge connections at a horizontal fore-and-aft line, whereby they are adapted to fold together; the mechanism mounted on the two frames respectively, and a drive chain which transmits power from one to the other, and a tightener for said chain resting thereon at substantially the point at which the chain will fold when the frames are folded together; whereby the chain is retained on the sprocket wheels when the frames are so folded: substantially as set forth.

4. In a grain binder, in combination with the frames on which are journaled respectively the packer-crank-shaft and the needle-rock-shaft, said frames being horizontally hinged together and adapted to fold, the latter frame containing all the tripping and compressing mechanism and the former frame containing the clutch, the connection between the tripping mechanism and the clutch being made by an arm unattached to any part on the packer-crank-shaft frame and power being transmitted from the mechanism on one frame to that on the other by a drive chain; whereby the said driving and tripping connections from the mechanism on one frame to the mechanism on the other do not impede the folding of the frames together: substantially as set forth.

5. In combination with the knotting mechanism the needle and compressor, and their actuating mechanisms respectively, the compressor-controlling mechanism being adapted to cause the compressor to recede stubbleward while the needle is penetrating the grain, and thereby cause the bundle to take an excess of cord at the stubbleward side, and then to cause the compressor to advance grainward and continue its advance after the needle commences to retreat: substantially as set forth.

6. In a grain binder, in combination with a rock shaft having the trip and compressor arm mounted thereon in the path of the bundle, two levers beyond the path of the bundle, one rigid with said shaft and the other rocking loosely about the same axis; a spring reacting between said levers, and stop shoulders on said levers respectively which limit their relative motion in the direction resisted by the spring; the rigid lever having connections which control the clutch and the loosely mounted lever having connections to the compressor spring; whereby the tripping movement of the trip and compressor may be performed before the shoulders of the rigid and loose levers collide, and its compressing action is effected while said shoulders are stopped against each other: substantially as set forth.

7. In a grain binder, in combination, substantially as set forth, the fore-and-aft shaft H, having a trip and compressor arm thereon in the path of the bundle, and having rigid with it the lever arm $H^3$ and loosely mounted upon it the lever arm $H^4$; a spring reacting between said levers, and stop shoulders on said levers limiting their relative motion in the direction resisted by said spring; the trip rod connected to the rigid lever $H^3$, and the compressor spring connected to the loosely mounted lever $H^4$; the cam $G^{30}$ on the binder-drive-wheel $G^3$, and the lever L, actuated by said cam and connected to the compressor spring; and the clutch on the packer crank-shaft whose latch is controlled by the trip rod K: substantially as set forth.

8. In combination with the trip-lever $H^3$, and the clutch on the packer-crank-shaft; the trip-rod K, connected to the lever and adapted to trip the clutch latch; a guide for said trip rod, through which said rod is adapted to slide, mounted rigidly with the needle-rock-shaft; whereby the trip rod is held out of the path of the clutch latch until the needle has receded almost to its position of rest: substantially as set forth.

9. In combination with the lever H³, the trip rod K, and the clutch which it trips; the guide-bearing K' for said rod, adjustably mounted on the needle-crank-shaft: substantially as and for the purpose set forth.

10. The lever H³ on the trip and compressor shaft; the trip rod K connected thereto, and the clutch which it trips; the needle-rock-shaft having rigid with it the stop projection $k'$ to stop the lever when the needle is at the position of rest, and revolving out of the way of the lever when the needle is encompassing the bundle; whereby the trip and compressor may be advanced farther grainward while compressing the bundle than it is permitted to stand while operating as a trip: substantially as set forth.

11. In a grain binder, in combination with the needle and the compressor, an arm located in approximately the same vertical plane and underneath the bundle space, said arm being pivoted at its inner end to the needle and extending from said pivotal connection stubbleward over the needle and fulcrumed over the compressor rock shaft: substantially as and for the purpose set forth.

12. In a grain binder, in combination with the deck, on which the grain lies prostrate a gate at the discharge side, extending lengthwise of the grain, and thereby adapted to obstruct it at both heads and butts and mechanism which holds it in grain-obstructing position during the accumulation of the bundle, and which tilts it stubbleward but holds it still in position to check the heads and butts during the compression of the bundle: substantially as set forth.

13. In combination with the needle and binder deck, the gate hinged to the deck and the arm P connected to the needle and to the gate; whereby the rocking of the needle actuates the gate: substantially as set forth.

14. In combination with the binder-deck and the gate hinged thereto rifted in the plane of the needle rift of the deck; a link which connects the gate to the needle, whereby it is operated; the trip and compressor located in the plane of said rifts in deck and gate; the yoke F² extending across the rift in the gate and adapted to stop the trip and compressor when it is freed from the action of the compressor cam, and to lift said compressor before the cam commences to actuate it to return it to position of rest: substantially as set forth.

15. In combination with the deck, the needle and the gate; the arm P, which connects said gate and needle; the trip and compressor located in the plane of said arm P, and having a flange upon its hub which affords a fulcrum for said arm, said fulcrum being eccentric to the axis of the arm: substantially as and for the purpose set forth.

16. In a grain binder, a needle having a guide for the cord intermediate the heel and the point of the needle, consisting of a hook $E^{20}$, located opposite the aperture $E^{22}$ of the needle web, and curved away from the plane of said web between its root and point, the margins of the apertures of the web being curved in the opposite directions: substantially as set forth.

17. In combination with the bracket B⁴, having the hooked lug $b^{40}$, the tension latch R, adapted to be hooked onto said lug; the bolt R² inserted through the bracket and the latch; and the spring above the latch on the bolt provided with the adjusting and stopping nut; whereby said bolt and spring afford means for regulating the tension and at the same time retain the latch on the bracket: substantially as set forth.

18. The head-board hinged to the harvester and swinging freely on its pivotal connection, combined with a spring attached to the binder, and moving with it, arranged and adapted to hold the head-board in proper adjustment; substantially as set forth.

In testimony whereof I have hereunto set my hand, in the presence of two witnesses, at Springfield, Ohio, this 30th day of January, 1892.

ANDREW STARK.

Witnesses:
D. D. SPELLMAN,
R. D. BALDWIN.